United States Patent
Meschke et al.

(10) Patent No.: US 10,993,373 B2
(45) Date of Patent: May 4, 2021

(54) CORN HEADER ROW UNIT

(71) Applicant: DEERE & COMPANY, Moline, IL (US)

(72) Inventors: Michael T. Meschke, Geneseo, IL (US); Steve A. Coon, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 225 days.

(21) Appl. No.: 16/106,209

(22) Filed: Aug. 21, 2018

(65) Prior Publication Data
US 2020/0060084 A1    Feb. 27, 2020

(51) Int. Cl.
*A01D 45/02*    (2006.01)
*A01D 41/127*    (2006.01)

(52) U.S. Cl.
CPC ......... *A01D 45/021* (2013.01); *A01D 41/127* (2013.01); *A01D 45/023* (2013.01); *A01D 45/028* (2013.01)

(58) Field of Classification Search
CPC ...................... A01D 41/127; A01D 45/02–028
See application file for complete search history.

(56) References Cited

U.S. PATENT DOCUMENTS

| | | | |
|---|---|---|---|
| 3,858,384 A | 1/1975 | Maiste et al. | |
| 3,894,382 A * | 7/1975 | Jauss | A01D 45/021 56/14.3 |
| 5,680,750 A | 10/1997 | Stefl | |
| 8,224,534 B2 | 7/2012 | Kowalchuk | |
| 9,179,602 B2 * | 11/2015 | Vandeven | A01D 45/021 |
| 9,320,196 B2 * | 4/2016 | Dybro | A01D 45/021 |
| 9,578,808 B2 | 2/2017 | Dybro et al. | |
| 9,668,420 B2 | 6/2017 | Anderson et al. | |

(Continued)

FOREIGN PATENT DOCUMENTS

| | | |
|---|---|---|
| DE | 8814148 U1 | 6/1989 |
| WO | 2016106394 A1 | 6/2016 |
| WO | 2017027486 A1 | 2/2017 |

OTHER PUBLICATIONS

"Automatic Self-Adjusting Deck Plates Now With Quadsuspension", http://https://www.dragotec.com/products/drago-gt/#, publication date unknown.

(Continued)

*Primary Examiner* — Adam J Behrens
(74) *Attorney, Agent, or Firm* — Taft Stettinius & Hollister LLP; Stephen F. Rost

(57) ABSTRACT

A row crop header for an agricultural machine harvesting a crop having stalks, such as corn. The row crop header includes a frame, a first crop row divider mounted to the frame, and a second crop row divider mounted to the frame and spaced from the first crop row divider to define a space therebetween. A row unit is disposed at the space, wherein the row unit includes a deck assembly defining a gap, the deck assembly including a compliant deck configured to adjust the gap based on contact with the stalks of the crop. The compliant deck includes a plurality of overlapping plates having edges defining the gap where the edges are configured to move responsively to varying diameters of stalks. Crops are separated from the stalks upon contact with the overlapping plates. A gathering chain moves the separated crops toward a collector.

17 Claims, 7 Drawing Sheets

(56) References Cited

U.S. PATENT DOCUMENTS

| | | | |
|---|---|---|---|
| 9,693,503 B2 | 7/2017 | Dybro et al. | |
| 9,820,438 B2 | 11/2017 | Barry | |
| 9,832,928 B2 | 12/2017 | Dybro et al. | |
| 9,867,334 B2 | 1/2018 | Jongmans et al. | |
| 10,039,228 B2 * | 8/2018 | Walker | A01D 34/008 |
| 2008/0092507 A1 | 4/2008 | Bollig | |
| 2011/0041472 A1 | 2/2011 | Rottinghaus | |
| 2012/0029757 A1 | 2/2012 | Kowalchuk | |
| 2012/0204528 A1 | 8/2012 | Regier | |
| 2015/0082760 A1 | 3/2015 | Zentner | |
| 2015/0208580 A1 | 7/2015 | Walker et al. | |
| 2015/0319925 A1 | 11/2015 | Ricketts et al. | |
| 2016/0073585 A1 | 3/2016 | Cook et al. | |
| 2016/0113199 A1 | 4/2016 | Jongmans et al. | |
| 2016/0143217 A1 | 5/2016 | Lohrentz | |
| 2016/0174461 A1 | 6/2016 | Walker et al. | |
| 2016/0174462 A1 | 6/2016 | Walker | |
| 2016/0174463 A1 | 6/2016 | Barry | |
| 2016/0235004 A1 | 8/2016 | Aesaert et al. | |
| 2016/0278290 A1 | 9/2016 | Vandergucht et al. | |
| 2017/0055447 A1 | 3/2017 | Missotten et al. | |
| 2017/0055448 A1 | 3/2017 | Missotten et al. | |
| 2017/0055449 A1 | 3/2017 | Missotten et al. | |
| 2017/0094905 A1 | 4/2017 | Walker | |
| 2017/0127615 A1 | 5/2017 | Crow et al. | |
| 2017/0238467 A1 | 8/2017 | Gessel et al. | |
| 2017/0332547 A1 | 11/2017 | Walker | |
| 2017/0367262 A1 | 12/2017 | Lohrentz | |
| 2018/0020619 A1 | 1/2018 | Ricketts et al. | |
| 2018/0054960 A1 | 3/2018 | Gessel et al. | |
| 2018/0139902 A1 | 5/2018 | Walker et al. | |
| 2019/0090425 A1 | 3/2019 | Ricketts | |
| 2020/0037505 A1 * | 2/2020 | Walker | A01D 43/083 |

OTHER PUBLICATIONS

John Deere Row Unit Deck Plate, https://www.deere.com/en/harvesting/corn-heads/712c-corn-head/, publication date unknown.

European Search Report issued in counterpart European Patent Application No. 19192421.6 dated Jan. 28, 2020 (5 pages).

* cited by examiner

CORN HEADER ROW UNIT

FIELD OF THE DISCLOSURE

The present disclosure relates to a combine harvester, and more particularly, to a corn head row unit for a combine harvester.

BACKGROUND

Agricultural machines, such as a combine harvester, include different portions or sections for cutting crop and moving the crop therethrough. A header for an agricultural combine harvester is arranged to be moved in a forward direction over a field. The header comprises a laterally extending frame supporting a separating mechanism to separate a crop, such as wheat or corn, from a stalk. The separating mechanism, in different embodiments, is configured to either cut the crop or to break the crop from the stalk to collect the crop. The separated crop is collected and delivered to a collector, such as a wagon, for delivery of the crop to a consumer.

A corn header includes a number of crop dividers defining a gaps to direct stalks of corn to a row unit. The row unit includes a gathering chain, a fixed deck plate, and stock rolls configured to separate corn ears from the stalk. The separated corn ears are supported by deck plates, which are separated by an adjustable gap. The corn ears are moved by the gathering chain to a floor of the header. An auger is located above the floor moves the corn ears to a collection location for collection.

When the corn ear is separated from the stalk, kernels of corn can be separated from the cob due to impact with the deck plate. Corn yield per acre is consequently reduced. Because the gap of the deck plate is adjusted prior to separating the corn ear from the stalk, the gap can be too large or too small. If too large, small ears of corn can fall through the gap and are lost. If the gap is somewhat large, but not small enough, butt shelling occurs, where the stalk rolls contact the butt end of the ear before it is separated from the stalk. If the gap is too narrow, excessive material such as leaves from the stock, and other debris, such as weeds, are collected by the corn header, which when accumulated, wraps on the auger and prevents the corn ears from being effectively moved by the auger to the collection location.

What is needed therefore is a corn head that reduces loss of kernels resulting from the gap being set too wide or too narrow for a field of corn.

SUMMARY

In one embodiment of the present disclosure there is provided a row crop header for an agricultural machine harvesting a crop having stalks. The row crop header includes a frame, a first crop row divider mounted to the frame, and a second crop row divider mounted to the frame and spaced from the first crop row divider to define a space therebetween. A row unit is disposed at the space, wherein the row unit includes a deck assembly defining a gap, the deck assembly including a compliant deck configured to adjust the gap based on contact with the stalks of the crop.

In another embodiment of the present disclosure, there is provided a crop divider for an agricultural machine harvesting a crop having stalks. The crop divider includes a deck assembly defining a gap having a first gap end and a second gap end, the deck assembly including a compliant deck configured to adjust the gap between the first and the second gap ends based on contact with the stalks of the crop. A gathering chain assembly is disposed adjacently to the compliant deck and is configured to move crop separated from the stalks toward the second end.

In a further embodiment, there is provided a combine including a corn header for harvesting corn ears from a corn stalk. The combine includes a first compliant deck having a first plurality of overlapping plates and a first gathering chain disposed adjacently to the first plurality of overlapping plates, the first gathering chain configured to move with movement of the first plurality of overlapping plates. A second compliant deck includes a second plurality of overlapping plates, defining a conformable gap with the first plurality of overlapping plates, the conformable gap extending along a longitudinal axis from a first end and to a second end. A second gathering chain is disposed adjacently to the second plurality of overlapping plates and the second gathering chain is configured to move with movement of the second plurality of overlapping plates. The first plurality of overlapping plates moves in a direction inclined with respect to the longitudinal axis in response to contact with the corn stalk.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
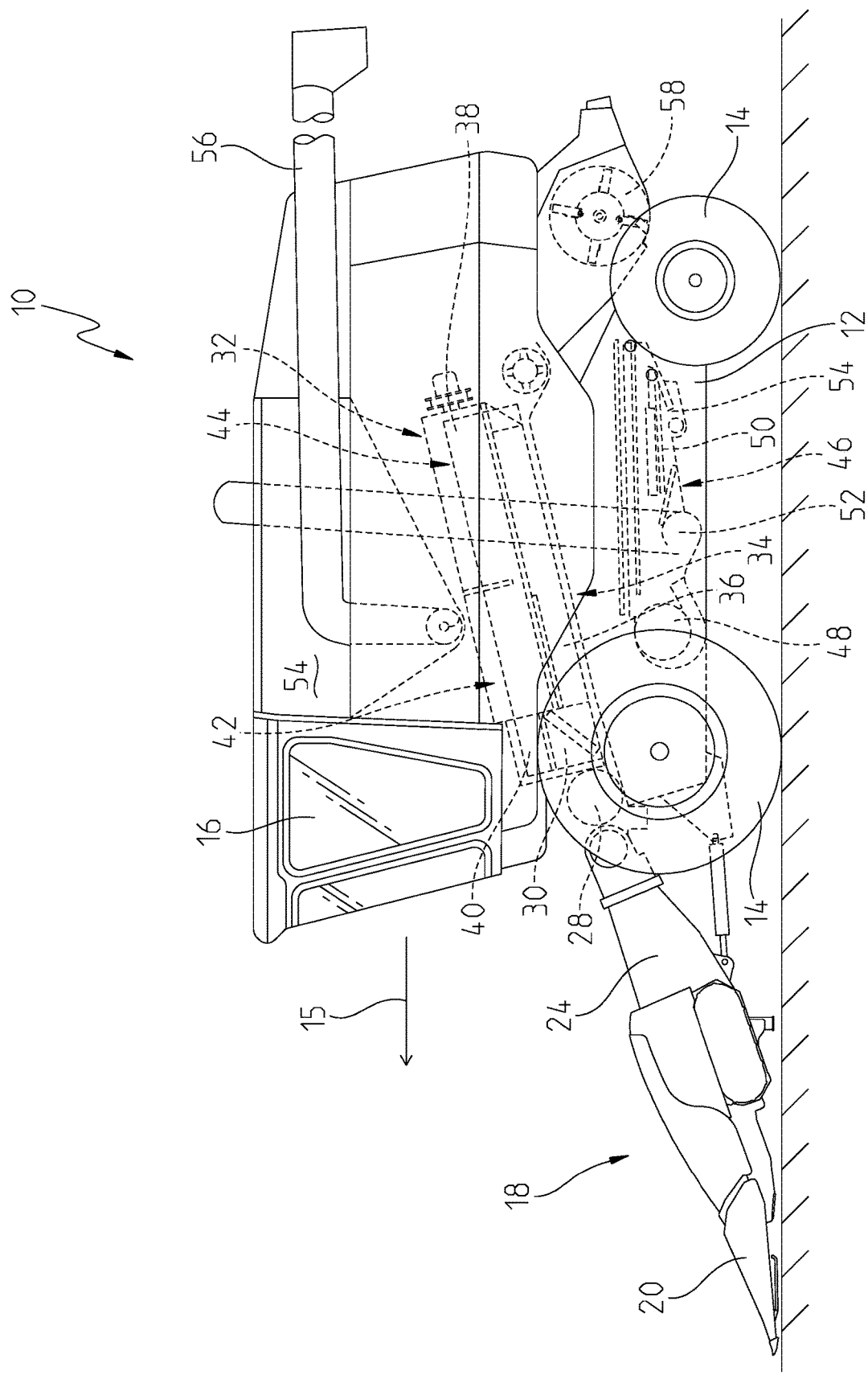
FIG. 1 is side view of a combine harvester.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

FIG. 1 illustrates an embodiment of an agricultural combine harvester 10 including a chassis 12 with wheels 14 in contact with the ground. Wheels 14 are coupled to the chassis 12 and are used for propulsion of the combine 10 in a forward operating or travelling direction 15. The operation of the combine 10 is controlled from an operator's cab 16. The operator's cab 16, in different embodiments, includes one or more controls (not shown) for controlling the operation of the harvester 10. A corn header 18 is disposed at a forward end of the harvester 10 and includes a plurality of crop row dividers 20, also called snouts 20, to direct stalks of corn into the corn header and to separate corn ears from the stalks. The corn ears are directed by a crop auger assembly 22 (see FIG. 2) and directed by a slope conveyor 24 toward a guide drum 28 which directs the corn ears to an inlet transition section 30. The inlet transition section 30 directs the cut crop to an axial harvested crop processing arrangement 32.

The harvested crop processing arrangement 32 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 32. A threshing section 42 and a separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 32. In place of the axial harvested crop processing unit 32, a tangential threshing drum with a following axial threshing section or a straw chopper can also be used.

Corn and chaff that fall through a thresher basket associated with the threshing section 42 and through a separating grate associated with the separating section 44 may be directed to a cleaning system 46 with a blower 48 and sieves 50 with louvers. The sieves 50 can be oscillated in a fore-and-aft direction. The cleaning system 46 removes the chaff and guides the clean corn over a screw conveyor 52 to an elevator for clean corn (not shown). The elevator for clean corn deposits the clean corn in a corn tank 54. The clean corn in the corn tank 30 can be unloaded by means of an unloading screw conveyor 56 to a corn wagon, trailer, or truck (not shown). Harvested crop remaining at the lower end of the sieve 50 is again transported to the harvested crop processing arrangement 32 by a screw conveyor 54 and an overhead conveyor (not shown). The harvested crop residue delivered at the upper end of the sieve 50 that consists essentially of chaff and small straw particles may be conveyed by means of an oscillating sheet conveyor to a chopper rotor assembly 58.

Figure 2:
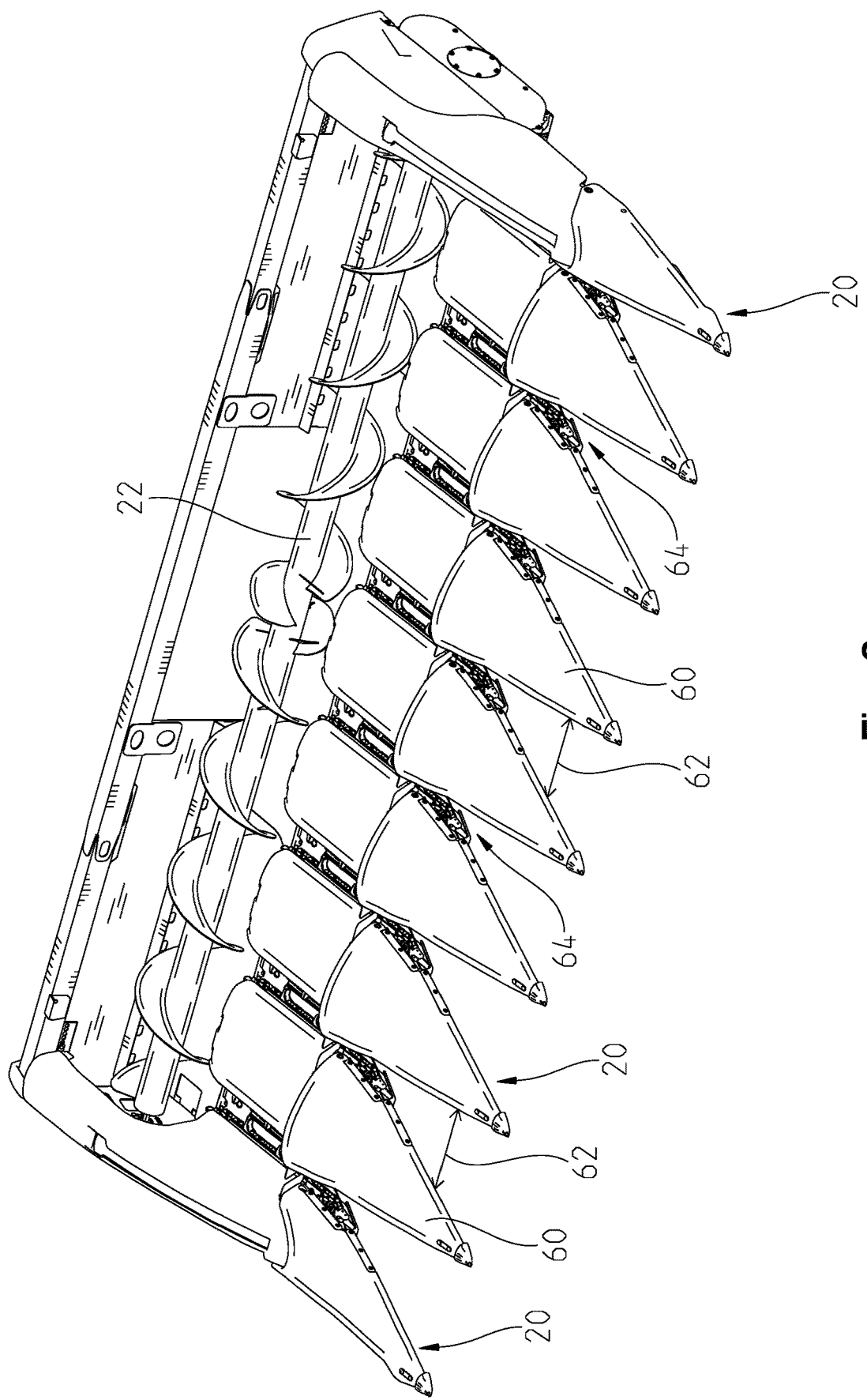
FIG. 2 is a perspective view of a corn row header.

As further illustrated in FIG. 2, the corn header 18 includes a plurality of crop row dividers 20 and the crop auger assembly 22. Each of the crop row dividers 20 includes a cone-shaped nose 60, wherein a space 62 is defined between adjacent noses 60. The space 62 is generally aligned with a corn row by the operator or by an automatic guidance system that directs the vehicle 10 along a row. As the vehicle 10 moves forward, the corn stalks are directed to a deck assembly 64, also identified as a row unit, also illustrated in FIGS. 3, 4, 5, and 6.

The deck assembly 64 includes a first compliant deck 66 and a second compliant deck 68 spaced from the first compliant deck by a gap 70. The corn stalks enter the space 62 and are directed by the adjacent noses 60 into the gap 70. The gap 70 extends from first end or front 72 to a second end or rear 74 of the deck assembly 64. The gap 70 includes a variable width from the front 72 to the rear 74 as later described herein.

A first gathering chain assembly 75 is disposed above the first compliant deck 66 and includes a plurality of links 76, some of which include paddles 78. A second gathering chain assembly 80 is disposed above the second compliant deck 68 and includes a plurality of links 82, some of which are paddles 84. As the stalks move along the gap from the first end 72 to the second end 74, a stock roll assembly 86 captures the stalk and pulls the stalk toward the ground. The stalk roll assembly 86 includes counter rotating stock rolls 87 as further illustrated in FIG. 6. The corn stalk is pulled toward the first compliant deck 66 and the second compliant deck 68, whereupon a corn ear makes contract with one or both of the decks 66 and 68. Upon sufficient contact, the corn ear is separated from the stalk.

Each of the compliant decks 66 and 68 are configured to rotate about sprockets 90 which, in one embodiment, are fixedly located on a frame 92 of the deck assembly 64. In one embodiment, each of the sprockets 90 rotates about a fixed axis defined by the center of rotation of the sprocket. Because the rotational axis of the sprockets is fixed at the first end 72 and the second end 74 of the deck assembly 64, the distance of the gap at the first end 72 and the distance of the gap at the second end 74 are fixed.

In one embodiment, the spacing between sprockets at the first end 72 and second end 74 are fixed to accommodate a diameter of stalk considered to be the largest stalk that is anticipated. In another embodiment, the sprockets 90 are fixedly coupled to adjustable support plates which are moveable with respect to one another to adjust a distance between sprockets 90 located on different deck assemblies.

The sprockets 90 are configured to rotate each of the compliant decks 66 and 68 in opposite directions such that a portion of the first compliant deck 66 and a portion of the second compliant deck 68 disposed at the gap 70 move in phase from the first end 72 to the second end 74. The ears of corn, which are supported by the moving compliant decks 66 and 68, are moved along by the paddles 78 and 84 of the gathering chains 74 and 80. The ears of corn exit the deck assembly 64 at the second end 74.

Figure 3:
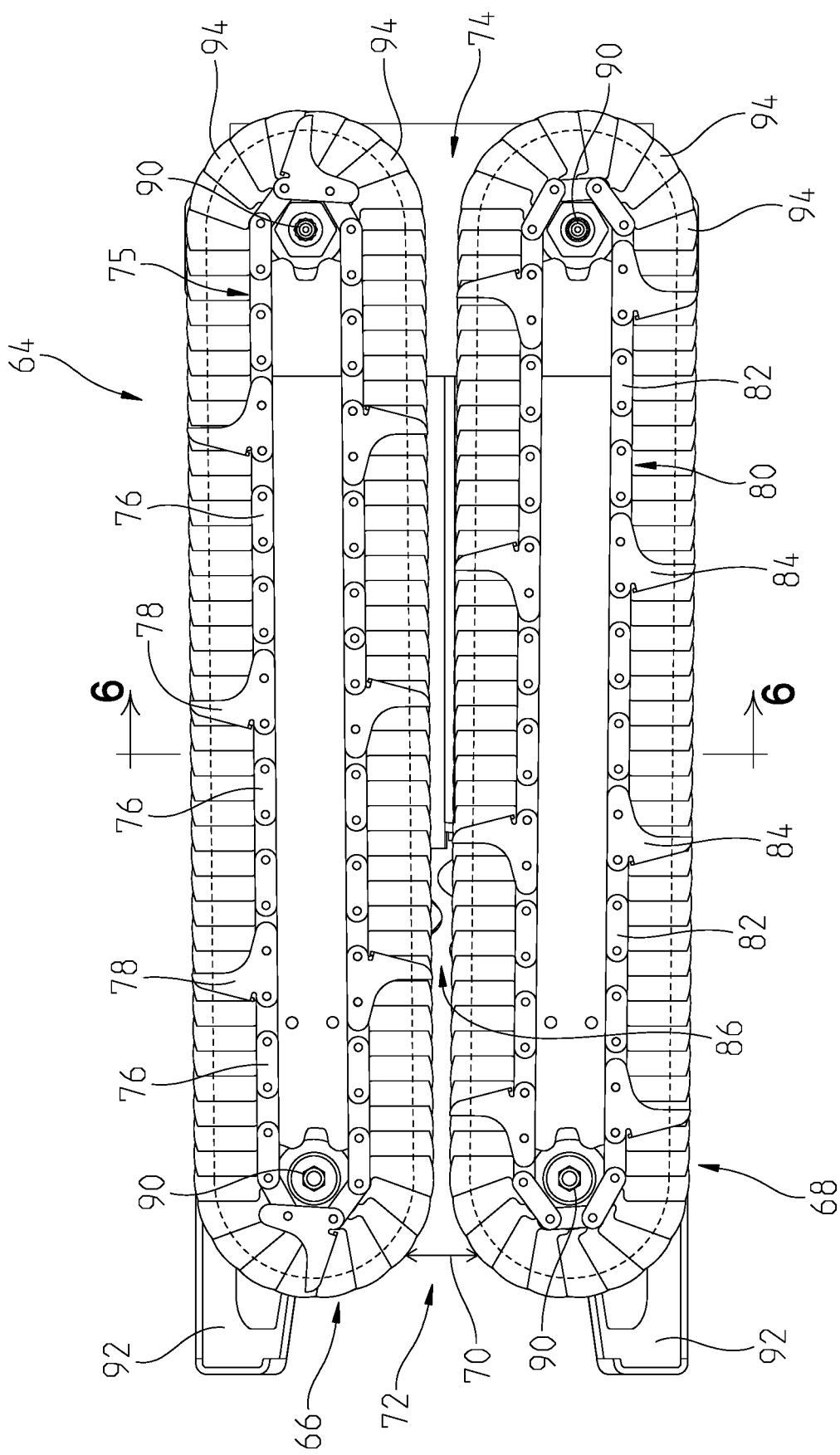
FIG. 3 is top view of a deck assembly.
Figure 4:
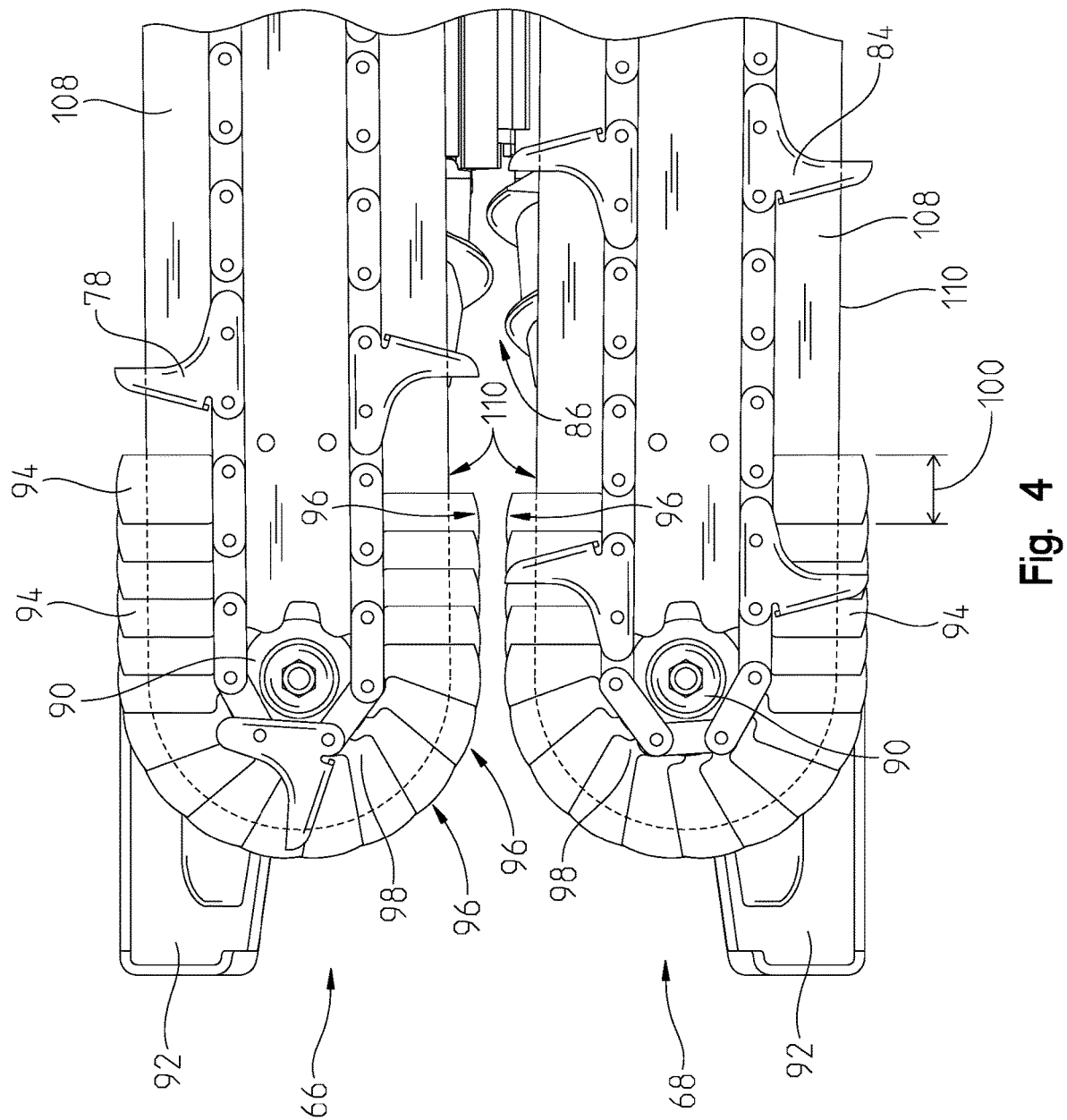
FIG. 4 is a top view of a portion of the deck assembly of FIG. 3.
Figure 5:
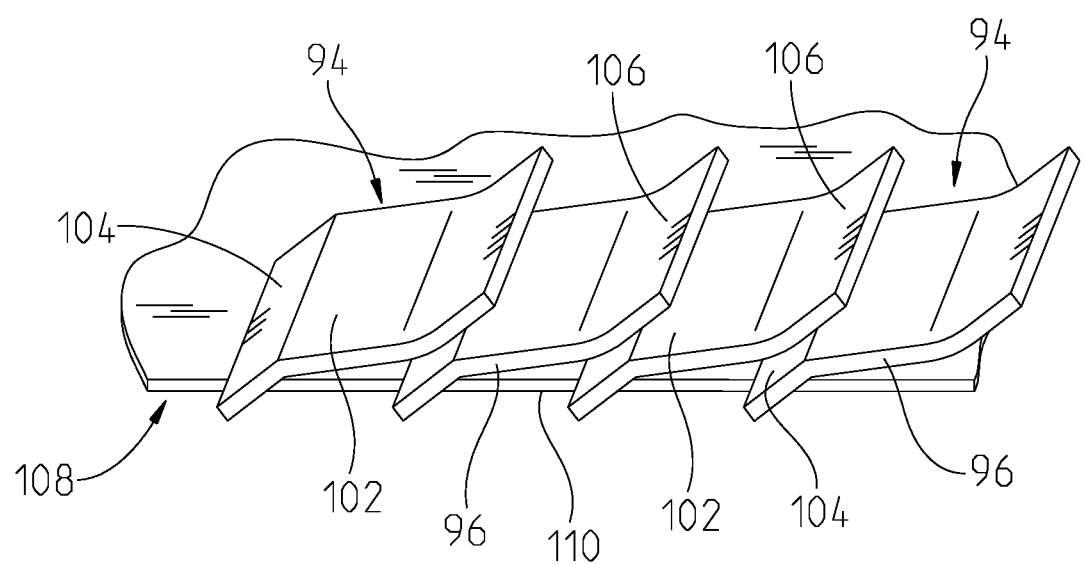
FIG. 5 a perspective view of a portion of a conformable deck supported by a deck support.

Each of the compliant decks 66 and 68 includes a plurality of plates 94 as seen in FIGS. 3 and 4. A perspective view of the plates 94 is illustrated in FIG. 5. Each of the plates 94 is generally rectangular in shape and overlaps an adjacent plate 94. Each plate 94 includes a front edge 96 which defines a variable width of the gap 70 as stalks of corn move from first end 72 to the second end 74. Each of the plates 94 further includes a rear portion 98 which is fixedly coupled to one or more of the links 76 or 82. Each of the plates 94 is coupled to the respective gathering chain such that the overlap between plates is sufficient such to prevent a gap or space between adjacent plates including at the front edges 96 of adjacent plates. For instance, as the plates 94 move about the sprockets at the first end 72 and the second end 74, spaces between the side edges of the plates are substantially non-existent. Each of the plates 94 includes a width 100 that is selected based on, in one embodiment, the radius of the arc made by the plates when moving at the sprockets.

In one embodiment as illustrated in FIG. 5, each of the plates 94 includes a central portion 102, an underlying portion 104 extending from the central portion 102 and a overlying portion 106 extending from the central portion 102. Each of the plates 94 are partially supported by a support deck 108, such that front edges 96 extend past an edge 110 of the support deck 108 as also seen in FIG. 6.

Figure 6:
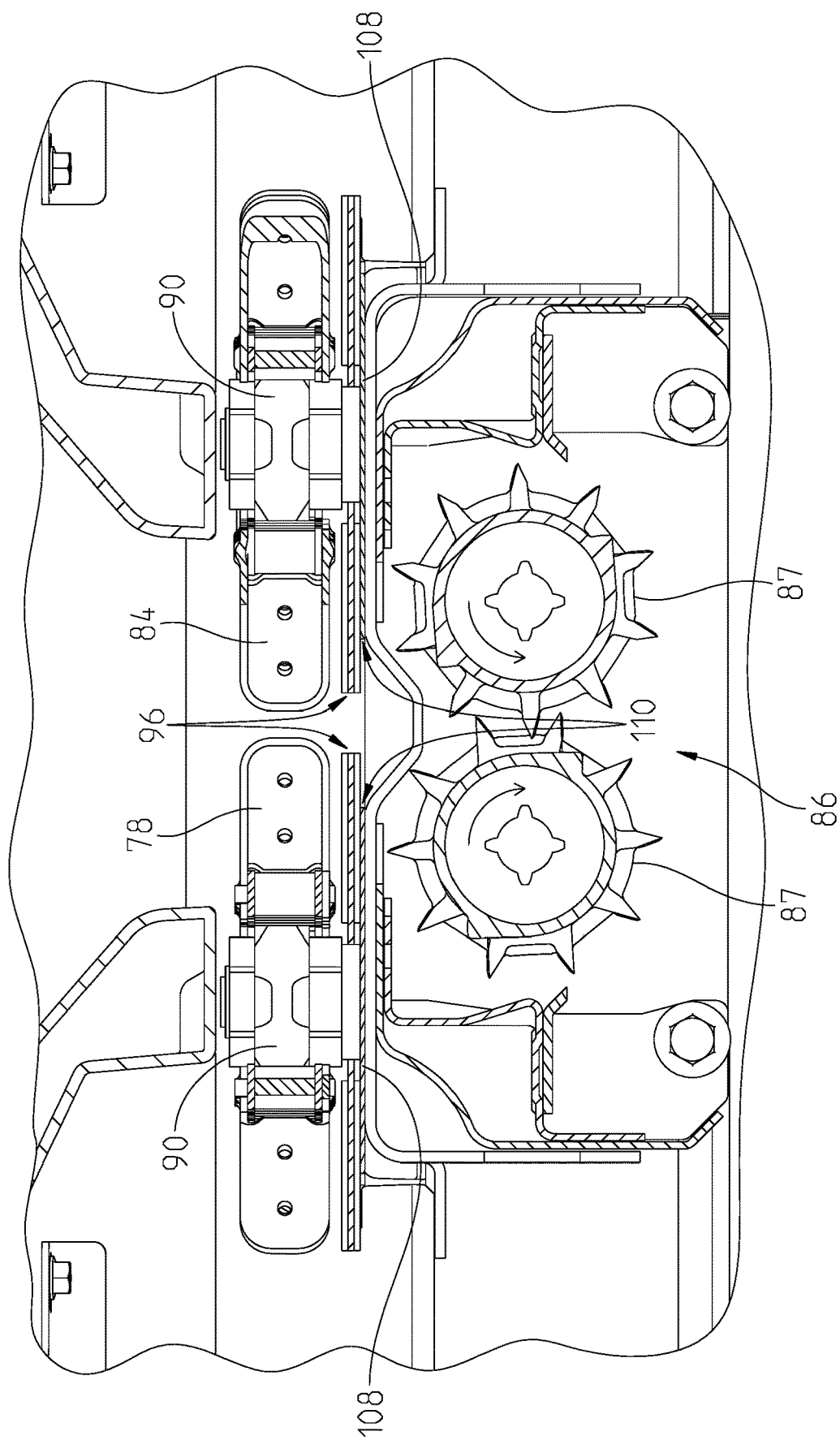
FIG. 6 is side view of a deck assembly.

As illustrated in FIGS. 4 and 6, the front edges 96 of the plates extend past the edge 110 of the support deck 108. Some of the plates 94 are removed from FIG. 4 to illustrate the support deck 108.

Figure 7:
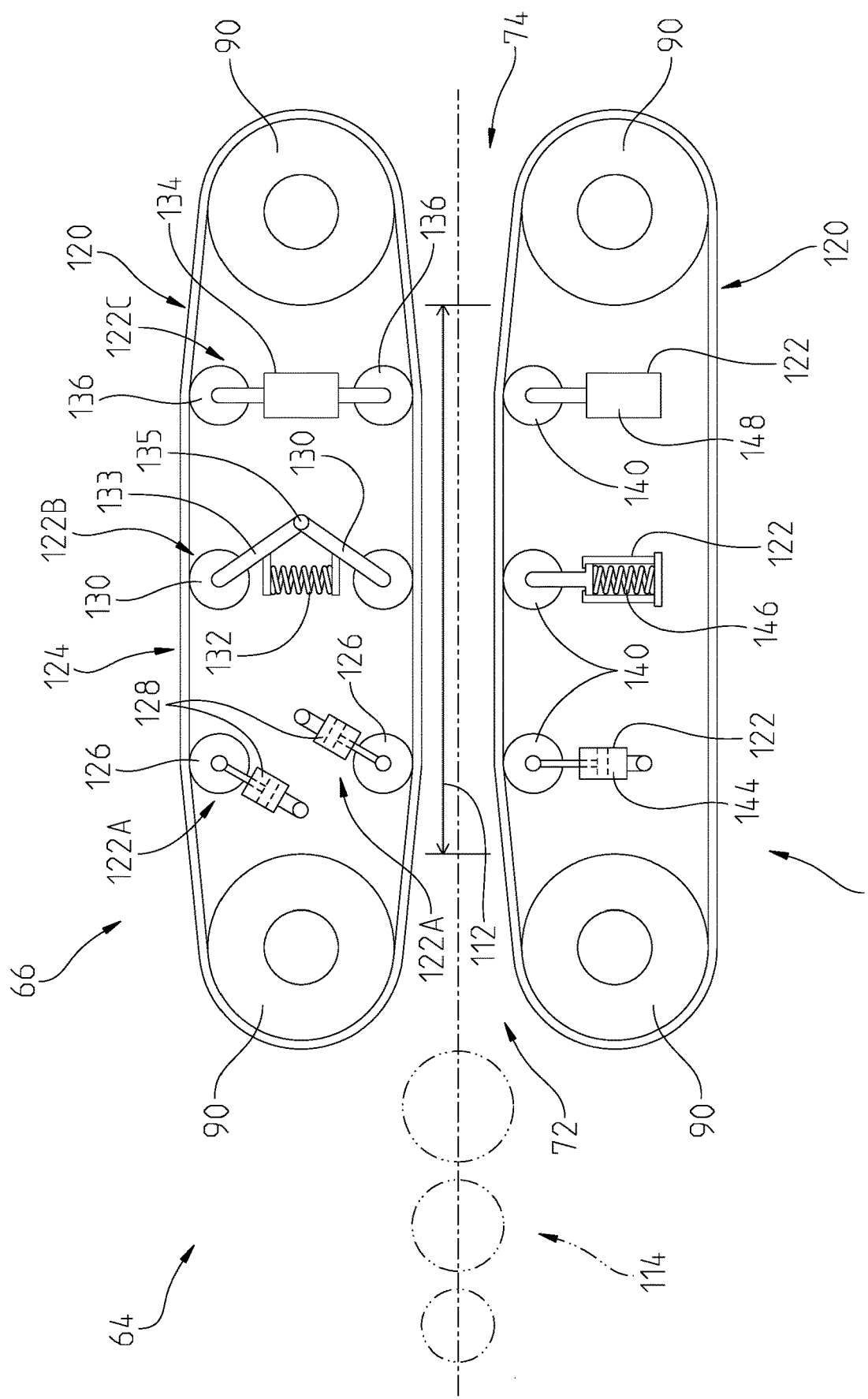
FIG. 7 is a schematic view of a drive assembly for a deck assembly.

FIG. 7 illustrates the deck assembly 64 with the compliant decks 66, 68 and the gathering chains 75, 80 removed to illustrate different embodiments of a drive assembly configured for the compliant decks 66 and 68. As the plates 94 move between the sprockets 90 at the front end 72 and the rear end 74, an intermediate portion 112 of the gap 70 is configured to adjust the gap 70 to stalks 114 having diameters of different sizes, here illustrated a circles. The intermediate portion 112 is intermediate the sprockets 90 at the front end 72 and the rear end 74. The plates 94 of the compliant deck 66 are coupled to drive belts 120, which in one embodiment are configured as part of the gathering chain 75 or as part of the gathering chain 80. In other embodiments, the drive belts 120 are separate from the gathering chains, but are coupled thereto. The drive assembly for the compliant decks 66 and 68 includes the sprockets 90 and further includes one or more conforming devices 122 configured to adjust the width of the gap 70 in the intermediate portion 112. In this intermediate portion 112, the edges 96 of the plates provide a moveable edge of the gap 70 responsive to stalk diameter. As the stalks move along the intermediate portion 112, the conforming devices 122 adjust the width of the gap in response to the diameter of the stalks. Once the corn ear is separated from the stalk, the moveable edge returns to a location determined by the conforming devices 122. In one or more embodiments, the drive belts are chain link belts of a metal material, a synthetic or natural material, or a material including one or more of metal, synthetic or natural materials.

In different embodiments shown in FIG. 7, the first compliant deck 66 includes conforming devices 122 configured to resiliently adjust to a pressure along the intermediate portion 112, as well as to any pressure that occurs on a side 124 opposite the intermediate portion 112. In this embodiment, devices 122A include sprockets 126 resiliently supported by a resilient device 128, such as a spring or a hydraulic cylinder. Conforming device 122B includes first and second sprockets 130 supported by a resilient device 132, which reacts for movement of sprockets 130. The sprockets are coupled together by a lever arm 133 having a pivot 135. In this embodiment, the resilient device includes a spring 132. Conforming device 122C is similarly configured as conforming device 122 B, except that a hydraulic cylinder 134 provides for movement of sprockets 136.

Further embodiments are illustrated for second compliant deck 68 in FIG. 7. In these embodiments, each of the devices 122 includes a single sprocket 140 engaging the drive belt 120. In these embodiments, however, a conforming device 122 is one or more of a hydraulic cylinder 144, a spring 146, or an electrically controlled adjustment device 148 having a pressure sensor coupled to a drive mechanism, such as linear drive, which senses pressure on the drive belt 120 resulting from the corn stalk and adjusts the linear drive accordingly.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

What is claimed is:

1. A row crop header for an agricultural machine harvesting a crop having stalks comprising:
   a frame;
   a first crop row divider mounted to the frame;
   a second crop row divider mounted to the frame and spaced from the first crop row divider to define a space therebetween;
   a row unit disposed at the space, wherein the row unit includes a deck assembly defining a gap, the deck assembly including a first compliant deck and a second compliant deck configured to adjust a width of the gap based on contact with the stalks of the crop, wherein the compliant deck includes a first plurality of overlapping plates having edges defining a first side of the gap and a second plurality of overlapping plates having edges defining a second side of the gap, wherein the first plurality and the second plurality of overlapping plates are each operatively connected to a respective first and second drive belts;
   at least one conforming device directly pressing on the first or second drive belt to apply a pressure thereto, wherein the width of the gap is adjusted by the at least one conforming device in response to contact with the stalks of the crop.

2. The row crop header of claim 1, wherein the compliant deck includes a first end, a second end, and an intermediate portion between the first end and the second end, wherein the intermediate portion defines a moveable edge on either side of the gap, the movable edge configured to move responsively to contact with the stalks of the crop, wherein the movable edge varies continuously in response to the size of the stalks.

3. The row crop header of claim 2, wherein the row unit includes a stalk roll assembly disposed adjacently to the deck assembly, wherein the stalk roll assembly is configured to receive the stalks of the crop and to separate the crop from the stalks based on contact of the crop with the overlapping plates.

4. The row crop header of claim 3, wherein the row unit includes a gathering chain assembly disposed adjacently to the compliant deck, wherein the drive belts are a part of the gathering chain assembly.

5. The row crop header of claim 1, wherein the first compliant deck includes a first end, a second end, and an intermediate portion between the first end and the second end, wherein the intermediate portion defines a first moveable edge of the gap configured to move responsively to contact with the stalks of the crop, wherein the first movable edge is responsive to a first conforming device of the at least one conforming device.

6. The row crop header of claim 5, wherein the second compliant deck includes a first end, a second end, and an intermediate portion between the first end and the second end, wherein the intermediate portion defines a second moveable edge of the gap configured to move responsively to contact with the stalks of the crop, wherein the second movable edge is responsive to a second conforming device of the at least one conforming device.

7. The row crop header of claim 6, wherein the intermediate portions of the first compliant deck and the second compliant deck define a continuously variable gap along the intermediate portions.

8. The row crop header of claim 7, wherein the row unit includes a first gathering chain assembly disposed adjacently to the first compliant deck and a second gathering chain assembly disposed adjacently to the second compliant deck.

9. A crop divider for an agricultural machine harvesting a crop having stalks comprising:
   a deck assembly defining an adjustable gap having a first gap end and a second gap end, the deck assembly including a compliant deck configured to adjust the adjustable gap between the first and the second gap ends based on contact with the stalks of the crop, wherein the compliant deck includes a first plurality of overlapping plates connected to a first drive belt, the first plurality of overlapping plates having edges defining a first side of the adjustable gap, a second plurality of overlapping plates connected to a second drive belt, the second plurality of overlapping plates having edges defining a second side of the adjustable gap, and at least one conforming device to resiliently adjust a pressure along the adjustable gap by adjusting a width of the adjustable gap in response to a size of the stalks, wherein the adjustable gap is defined by a distance between the edges defining the first side of the adjustable gap and the edges defining the second side of the adjustable gap, the at least one conforming device directly pressing on at least the first drive belt or the second drive belt; and a gathering chain assembly disposed adjacently to the compliant deck configured to move crop separated from the stalks from the first gap end toward the second gap end.

10. The crop divider of claim 9, wherein the compliant deck includes an intermediate portion defining a moveable edge configured to move responsively to contact with the stalks of the crop, wherein the movable edge is responsive to the at least one conforming device configured to resiliently respond to a pressure directed by the stalks to the edges defining the first side of the gap and the edges defining the second side of the gap.

11. The crop divider of claim 10, further comprising a stalk roll assembly disposed adjacently to the compliant deck, wherein the stalk roll assembly is configured to receive the stalks of the crop and to separate the crop from the stalks based on contact of the crop with the overlapping plates.

12. The crop divider of claim 9, wherein the compliant deck includes a first compliant deck and a second compliant deck, the first compliant deck including the first plurality of overlapping plates and the second compliant deck including the second plurality of overlapping plates.

13. The crop divider of claim 12, wherein the first compliant deck includes an intermediate portion between the first gap end and the second gap end, wherein the intermediate portion defines a first moveable edge of the gap configured to move responsively to contact with the stalks of the crop, wherein the first movable edge is responsive to a first conforming device of the at least one conforming device.

14. The crop divider of claim 13, wherein the second compliant deck includes an intermediate portion between the first gap end and the second gap end, wherein the intermediate portion defines a second moveable edge of the gap configured to move responsively to contact with the stalks of the crop, wherein the second movable edge is responsive to a second conforming device of the at least one conforming device.

15. The crop divider of claim 14, wherein the intermediate portions of the first compliant deck and the second compliant deck define a continuously variable gap along the intermediate portions.

16. A combine including a corn header for harvesting corn ears from a corn stalk comprising:

a first compliant deck including a first plurality of overlapping plates coupled to a drive belt and a first gathering chain disposed adjacently to the first plurality of overlapping plates, the first gathering chain configured to move with movement of the first plurality of overlapping plates;

a second compliant deck including a second plurality of overlapping plates, the second plurality of overlapping plates defining a conformable gap with the first plurality of overlapping plates, the conformable gap extending along a longitudinal axis from a first end and to a second end, and a second gathering chain disposed adjacently to the second plurality of overlapping plates, the second gathering chain configured to move with movement of the second plurality of overlapping plates, wherein the first plurality of overlapping plates is configured to move in a direction inclined with respect to the longitudinal axis in response to contact with the corn stalk; and at least one conforming device to resiliently adjust a pressure along the conformable gap in response to a size of the corn stalk, wherein the at least one conforming device directly applies a pressure to the drive belt and moves the first plurality of overlapping plates in the inclined direction to adjust a width of the conformable gap.

17. The combine of claim 16 wherein the second plurality of overlapping plates move in a direction inclined with respect to the longitudinal axis in response to contact with the corn stalk.

* * * * *